(No Model.)

E. L. BROWN.
STREET OR OTHER CURB.

No. 355,810. Patented Jan. 11, 1887.

Witnesses:
P. Armstrong
David Stevens

Inventor:
Edwin Lee Brown,
By Gridley & Fletcher,
his Attys.

UNITED STATES PATENT OFFICE.

EDWIN LEE BROWN, OF CHICAGO, ILLINOIS, ASSIGNOR OF ONE-HALF TO EDWIN F. BROWN, OF SAME PLACE.

STREET OR OTHER CURB.

SPECIFICATION forming part of Letters Patent No. 355,810, dated January 11, 1887.

Application filed September 17, 1886. Serial No. 213,778. (No model.)

*To all whom it may concern:*

Be it known that I, EDWIN LEE BROWN, of Chicago, in the county of Cook and State of Illinois, have invented certain new and useful Improvements in Street or other Curbs, of which the following is a description, reference being had to the accompanying drawings, in which—

Figure 2:
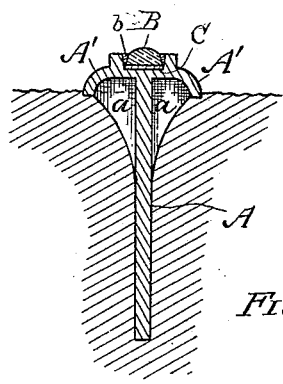
Figure 1:
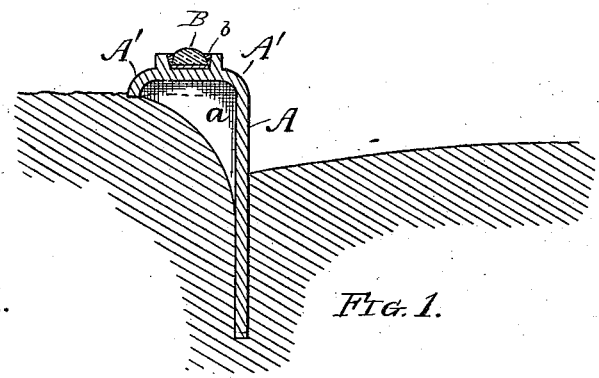
Figure 3:
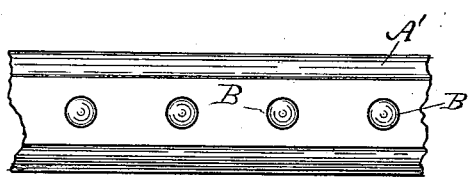
Figure 6:
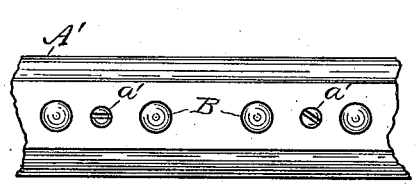
Figure 4:
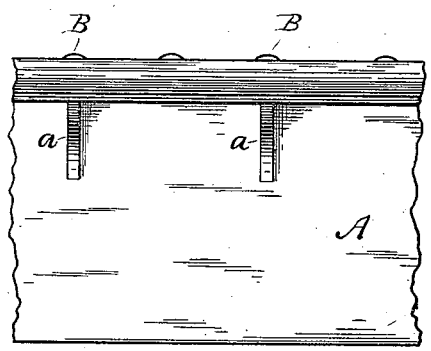
Figure 8:
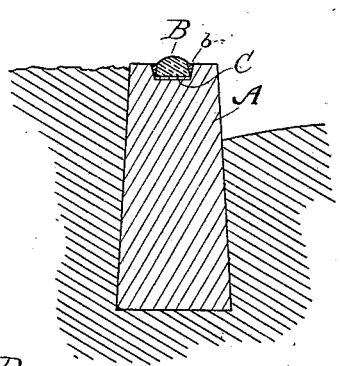
Figure 7:
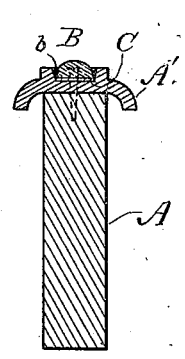
Figure 5:
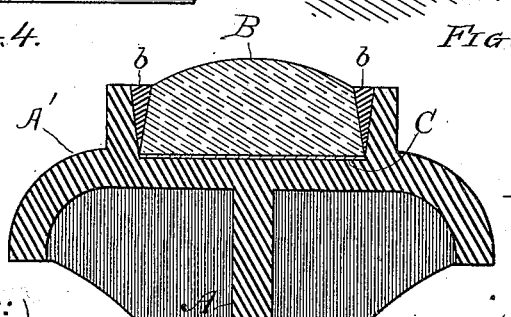

Figure 1 is a transverse sectional view of my improved street-curb. Fig. 2 is a like view of a "border-curb." Fig. 3 is a plan view of a portion thereof. Fig. 4 is a side view of the same. Fig. 5 is an enlarged detail view of a portion of Fig. 1. Fig. 6 is a plan view of a modification of said invention. Fig. 7 is a transverse sectional view thereof, and Fig. 8 is a like view of a still further modification.

Like letters of reference in the different figures designate like parts.
The primary object of my invention is to provide a self-luminous curb for streets and the borders of garden and other walks. A further purpose is to so construct the same as to enable it to permanently retain its luminous qualities, all of which is hereinafter more particularly described and claimed.

Referring to the drawings, A, Fig. 1, represents a curb adapted for street purposes where the surface of the ground is higher upon one side than upon the other; and it consists, preferably, of a cast-iron plate provided with a beaded or ornamental-shaped top or flange, A', which extends laterally therefrom and is caused to depend downwardly, as shown, to the surface of the ground. Webs *a* are cast upon one side thereof in this construction, and at a suitable distance from each other to impart a sufficient support to said top. Where said curb is used for a border, as in garden-walks, I prefer to extend the plate or body A downwardly from the middle of the part A', in which case the webs *a* are placed upon both sides of the plate, as shown in Figs. 2 and 5.

Within the top of said curb I form a series of recesses or depressions, into which I insert pieces of glass B, of any desired form; but by preference I adopt that shown in the drawings—viz., a circular lens, which is enlarged at the base and secured and hermetically sealed in place by means of cement or concrete *b*. (Better shown in Fig. 5.) Upon the back of the lenses, or beneath the same, I place a luminous or phosphorescent paint or material, C, capable of absorbing the rays of light during the day and giving them off at night. Said lenses may be placed any desired distance apart, their purpose being to indicate the position of the curb. It is apparent that they may be embedded in the top of natural or artificial stone, terra-cotta, or wood curbing, as shown in Fig. 8, or the part A' may be cast separately, and attached by means of screws, bolts, or nails *a'*, Figs. 6 and 7, to a wooden plank, A, Fig. 7. The advantages of the latter construction are obvious, in that it may be applied to any ordinary curb. The luminous material being placed in an air-tight depression and hermetically sealed therein, it is fully protected from the action of the elements, and hence may last indefinitely.

Having thus described my invention, what I claim as new, and desire to secure by Letters Patent, is—

1. A curb provided with a series of glasses embedded and hermetically sealed within the top thereof, each of which is provided with a luminous background, substantially as and for the purpose set forth.

2. As a new article of manufacture, a curb having a series of glasses embedded therein and backed with a luminous material, substantially as described.

3. A curb provided with a detachable metal top in which are embedded and hermetically sealed a series of glasses, each provided with a self-luminous background, substantially as and for the purposes specified.

EDWIN LEE BROWN.

Witnesses:
D. H. FLETCHER,
J. D. HALPENNY.